United States Patent Office 3,430,194
Patented Feb. 25, 1969

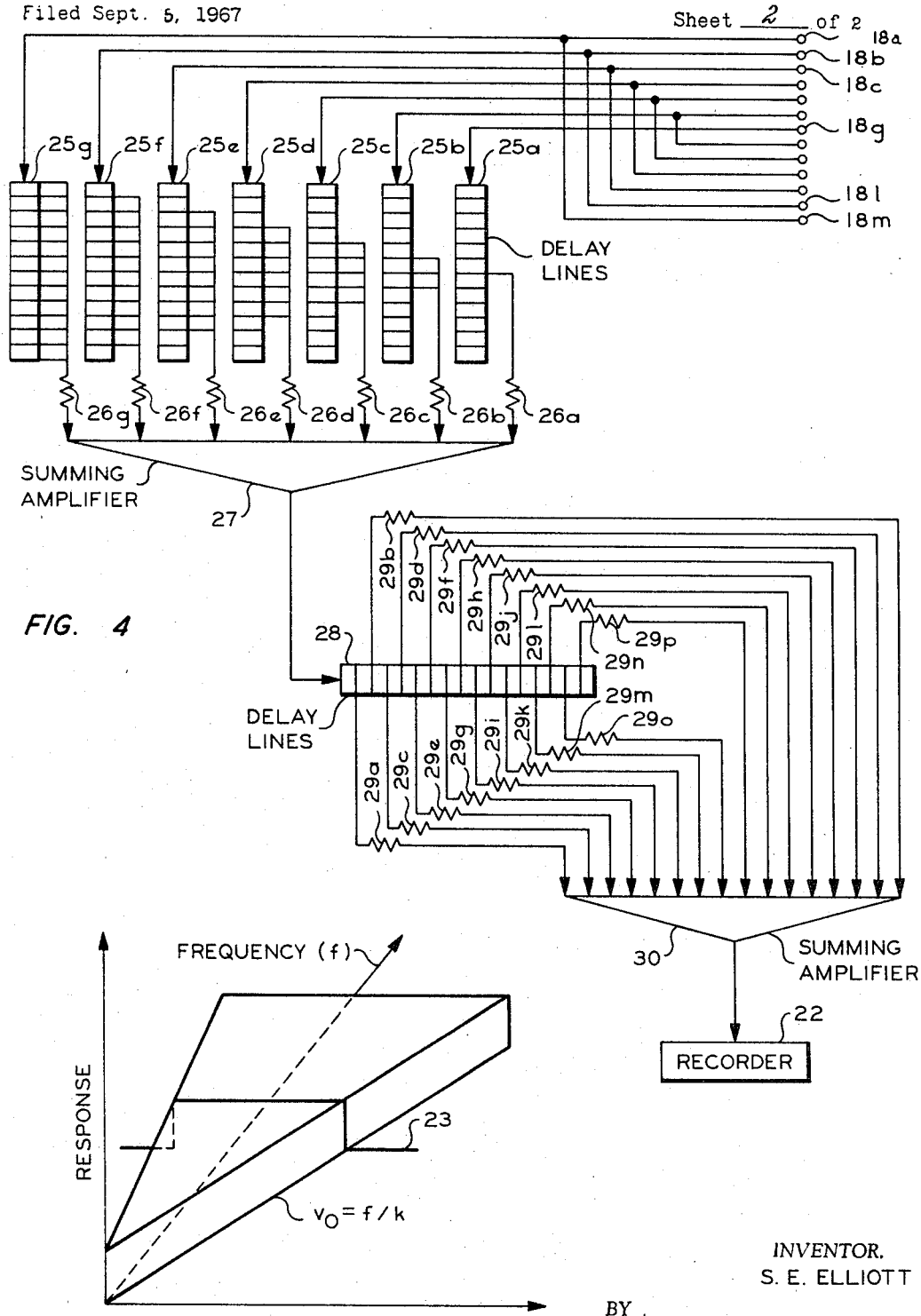

3,430,194
SEISMIC SIGNAL INTERPRETATION
Sheldon E. Elliott, Bartlesville, Okla., assignor to Phillips Petroleum Company, a corporation of Delaware
Filed Sept. 5, 1967, Ser. No. 665,519
U.S. Cl. 340—15.5         6 Claims
Int. Cl. G01v 1/00

ABSTRACT OF THE DISCLOSURE

Signals sensed by a plurality of seismic detectors at a seismometer detection station are velocity filtered and combined to produce a single trace characteristic of impulses received at the seismometer detection station.

---

Figure 2:
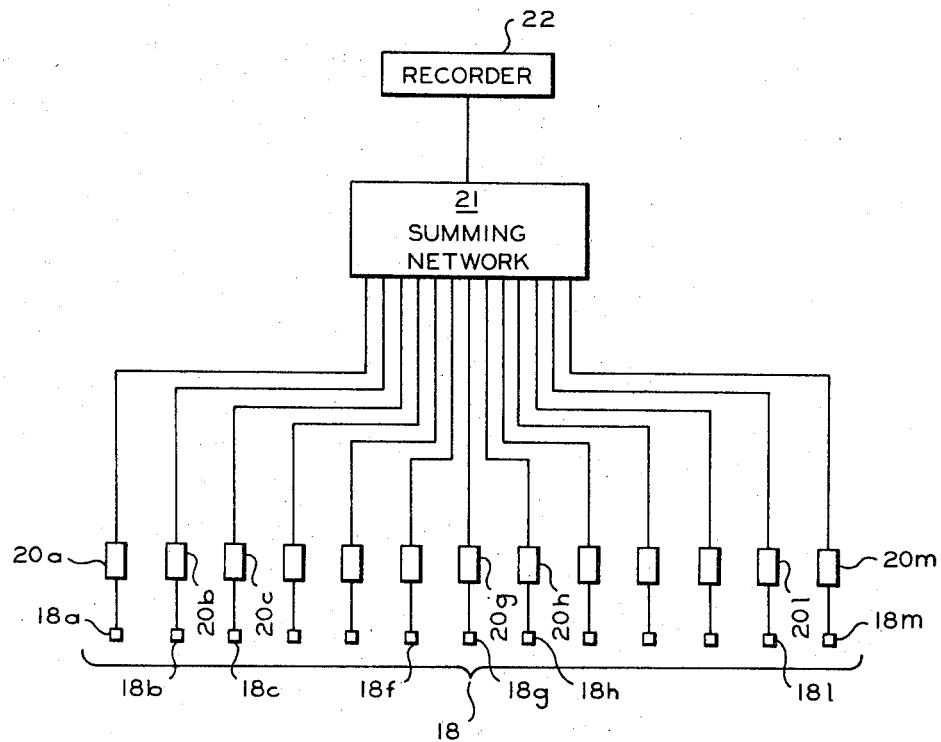

This invention relates to the detection and interpretation of seismic signals.

Seismic exploration relates to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot hole. The vibrations incident upon the seismometers are converted into counterpart electrical signals which are amplified and recorded. By timing the arrivals of selected reflections, valuable information can often be obtained regarding the depth and slope of subterranean earth formations. Unfortunately, however, other vibrations normally are present which tend to obscure the recognition of the desired reflected signals. In order to minimize these vibrations, a number of systems have been proposed which include electrical filter networks and selected spacings of the vibration pickups. However, there are still large sections of the country wherein it is impossible to obtain accurate information of subterranean formations because of the noise vibrations.

When multiple seismometers are used to make a single input trace with the outputs of the seismometers being algebraically summed, the signal obtained is not as great as would normally be expected. This is due to the curvature of the wave front and to the difference in times of arrival of the wave front at the plurality of seismometers. The combination of these two factors causes some signal responses to interfere with others. However, I have now discovered that the signal-to-noise ratio can be greatly improved by space time filtering signals received at a plurality of spaced seismometers which are located at the station. By so doing, the coherent noise is filtered out and the signal is enhanced relative to a summed, unfiltered signal. According to this invention, space time filtering is performed on a plurality of signals from a plurality of seismometers at each seismometer station and the filtered signals are summed. The space time filtering is such that all impulses having an apparent or trace velocity passing across the seismometer array greater than a predetermined value are enhanced relative to unfiltered summed signals and all impulses having an apparent or trace velocity less than a predetermined value are suppressed. By "apparent" or "trace" velocity I mean the velocity of an impulse as recorded by two spaced seismometers. In other words, the apparent or trace velocity is that velocity at which an impulse appears to move along a straight line containing the two seismometers at the surface or ground level. For horizontally traveling ground waves, the apparent or trace velocity is the actual velocity. For reflected waves from subterranean formations, the aparent or trace velocity is based on the difference in times of arrival of the wave front at the two seismometers. This "velocity" is considerably higher than the actual velocity of the reflected wave.

Accordingly, it is an object of this invention to provide an improved method and apparatus for interpreting seismic signals.

It is a further object to provide an improved system for enhancing the signal-to-noise ratio of a plurality of signals received at a given seismometer station.

Figure 1:
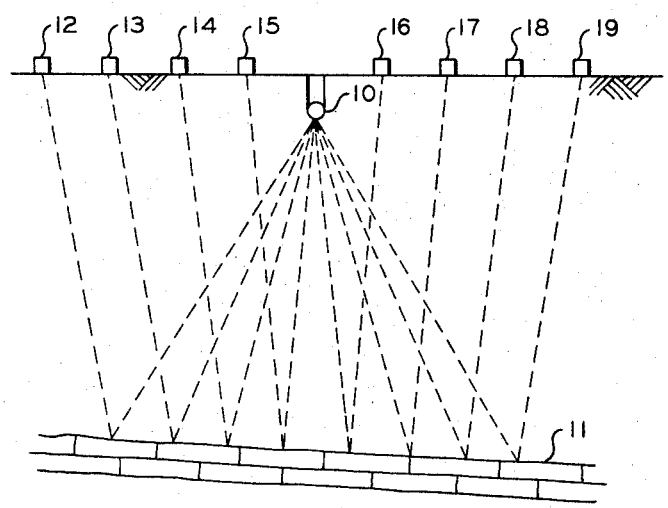

Other objects, advantages and features of this invention will be apparent to one skilled in the art from the following detailed description, taken in conjunction with the accompanying drawing in which:

FIGURE 1 is a schematic representation of a typical seismic exploration system in which this invention can be employed. FIGURE 2 is a schematic circuit drawing of filtering and summing apparatus employed in this invention. FIGURE 3 is a graphical representation of the response characteristics of the filters employed in the circuit of FIGURE 2. FIGURE 4 illustrates a specific embodiment of the filtering and summing apparatus of FIGURE 2.

Referring now to the drawing in detail and to FIGURE 1 in particular, vibrations are imparted to the earth at a first point 10 by detonating an explosive charge or by the use of another type of vibration imparting means. The resulting vibrations travel downwardly and are reflected back to the surface of the earth from subterranean reflecting beds, such as 11. These reflected vibrations are detected at a plurality of receiving stations 12 to 19 which are located on both sides of the shot point. Although only eight receiving stations are illustrated in order to simplify the drawing, a greater number of these stations normally is employed. While it is not necessary that these stations be located on both sides of the shot point, a greater amount of information is obtained from each shot by this procedure. In accordance with this invention, each receiving station is provided with a plurality of vibration responsive elements which are spaced from one another in a direction extending away from the shot point. For example, thirteen individual seismometers 18a, 18b ... 18m, see FIGURE 2, are positioned at receiving station 18 of FIGURE 1. These seismometers are spaced from one another in a direction which extends from shot point 10 to receiving station 18. It is preferred that the centermost seismometer 18g be located at the center of the receiving station. Each of the remaining receiving stations of FIGURE 1 is provided with a similar group of individual seismometers. These seismometers extend in both directions from the center point of each station, but generally do not overlap the seismometers of adjacent stations. In a typical exploration system of this invention, the seismometer stations can be approximately 600 feet apart. The seismometer spread at each station can thus extend over a distance of 600 feet, although other distances can also be used. While thirteen seismometers are shown, a greater number can be employed to advantage.

The seismometers illustrated in FIGURE 2 are devices which provide electrical output signals which vary in amplitude in accordance with the amplitudes of the vibrations received. The output signal from seismometer 18a is transmitted through a filter 20a to the first input of a summing network 21. Similarly, the outputs of seismometers 18b, 18c . . . 18m are transmitted through respective filters 20b, 20c . . . 20m to network 21. The output signal from network 21 is applied to a recorder 22. The individual filters and summing network 21 provide velocity filtering of the signals from the individual seismometers. These filters are designed such that the summed output for the plurality of seismometers does not contain impulses whose apparent or trace velocity is less than a preselected value.

The selection and design of these filters will be described with reference to FIGURE 3 which is a plot of relative response (B) versus wave number (k) and frequency (f). All velocities greater than plus or minus $v_0$ are represented by the pie-shaped solid in the three-dimensional diagram. All those velocities less than $v_0$ are represented by the area outside of the pie-shaped solid. A section 23 through the pie-shaped solid at a constant frequency will be a relative response versus wave length diagram. The three-dimensional solid is the desirable response function for the filter network.

The response B of three-dimensional pie-shaped solid illustrated in FIGURE 3 can be approximated by the following expression:

$$B\left(\frac{-|f|d}{v_0}, \frac{|f|d}{v_0}\right) = \sum_{n=-N}^{N} \left[2\frac{|f|d}{v_0}\left(\frac{\sin 2\pi n \frac{|f|d}{v_0}}{2\pi n \frac{|f|d}{v_0}}\right)\right] \cos 2\pi nkd \quad (1)$$

wherein $f$ is frequency, $d$ is the spacing between adjacent seismometers, $v_0$ is the cut-off velocity, i.e., the trace or apparent velocity below which value all signals will be viewed as noise and rejected and above which velocity all signals will be viewed as valid signals and transmitted, $n$ is the number assigned to the seismometer, i.e., from $-N$ to $+N$, which in FIGURE 2 is from $-6$ to $+6$, and $k$ is the wave number (reciprocal of wave length).

The sum of the outputs from an odd number of seismometers without the filter of this invention can be represented as follows:

$$\sum_{n=-N}^{N} R_n \left(\sum_{n=-N}^{N} [1] \cos 2\pi nkd\right) \cos 2\pi ft \quad (2)$$

wherein $k$, $n$, $d$ and $f$ are as defined above and $t$ is the time as measured from an origin which is the instant at which the maximum of the ground disturbance (assumed to be a sinusoidal wave) passes the center seismometer 18g, going from left to right in FIGURE 2.

In order to make the output signal from summing network 21 of FIGURE 2 approximate the pie-shaped configuration of FIGURE 3, it is necessary to replace the constant unity coefficient in brackets in Expression 2 with:

$$A_0 = 2\frac{|f|d}{v_0}$$

where $n=0$ $$A_n(f) = \left[2\frac{|f|d}{v_0}\left(\frac{\sin 2\pi n \frac{|f|d}{v_0}}{2\pi n \frac{|f|d}{v_0}}\right)\right], \quad n=-N \ldots -1, 1, \ldots N \quad (3)$$

Thus, the ideal response $\overline{R}$, with the filters of this invention, can be represented by the following expression:

$$\overline{R} = \sum_{n=-N}^{N} \overline{R}_n = \cos 2\pi ft \left[\sum_{n=-N}^{N} A_n(f) \cos 2\pi nkd\right]$$

$$\approx (\cos 2\pi ft) B\left(\frac{|f|d}{v_0}, \frac{|f|d}{v_0}\right) \quad (4)$$

In order to obtain the weighted value for each individual filter of FIGURE 2, a Fourier inversion is performed, as set forth in Campbell and Foster, "Fourier Integrals for Practical Applications," Van Nostrand & Co., 1942, p. 77. This gives the time transforms of the Fourier series, which can be represented as follows:

$$A_n(t) = \frac{1}{\pi 2} \cdot \frac{\frac{d}{v_0}}{\left(\frac{nd^2}{v_0} - t^2\right)} = \frac{1}{\pi 2} \frac{\zeta}{(n^2\tau^2 - t^2)}; \quad n \neq 0 \quad (5)$$

$$A_0(t) = -\frac{1}{\pi 2} \cdot \frac{\frac{d}{v_0}}{t^2} + \delta(t) = -\frac{\zeta}{\pi^2 t^2} + (\delta t) \quad (6)$$

wherein $t=$ the time as measured from seismometer 18g at the instant of time at which the maximum of the ground disturbance passes seismometer 18g going to the right, and $\tau$ is equal to $d/v_0$, which represents the cut-off wavelet stepout between seismometers, and $\delta(t)$ is a unit Dirac delta function as defined in Campbell and Foster.

In the above Expressions 5 and 6, $A_n$ is the filter response required for each of the respective filters of FIGURE 2. $A_0$ is the filter required for 20g, and so forth.

By the above system broad band wavelets having a sweep velocity greater than $v_0$ will be passed and broad band wavelets having a sweep velocity less than $v_0$ will be suppressed. Thus, if much of the seismic noise consists of broad band wavelets having a sweep velocity less than $v_0$, the filter system employed provides a natural means for separation of signal from noise on the basis of sweep velocity. In general, increasing the number of seismometers at each station increases the resolution.

The foregoing description of the filters has assumed an odd number of seismometers at each seismometer station. However, the invention can also be applied to a seismometer station which has an even number of seismometers. The filter responses for such a system will now be described.

The sum of the outputs of an even number of seismometers at a seismometer station can be approximated by the following expression:

$$2\left\{\sum_{n=1}^{N} \cos 2kd [\frac{1}{2} + (n-1)]\right\} \cos 2\pi ft \quad (7)$$

wherein $n$, $N$, $k$, $d$, $f$ and $t$ are as defined above. Further simplification of this expression gives the following:

$$\overline{R} = 2\sum_{n=1}^{N} R = \left\{\frac{\sin\left[2\pi\left(\frac{kd}{2}\right)(2N)\right]}{\sin 2\pi\left(\frac{kd}{2}\right)}\right\} \cos 2\pi ft \quad (8)$$

The desired boxcar function for an even number of seismometers can be expressed.

$$B = 1\left\{\sum_{n=1}^{N}\left[\frac{2 \sin \pi k_0 d(2n-1)}{\pi(2n-1)}\right] \cos 2\pi kd[\frac{1}{2} + (n-1)]\right\} \quad (9)$$

wherein B is the desired boxcar function, $n$, $N$ and $kd$ are defined above, and $k_0$ is the value of $k$ at the cut-off wave length.

The Fourier coefficients can be expressed as follows:

$$A_n = 4 \frac{\sin n\pi k_0 d}{n\pi} \quad (10)$$

wherein $k_0$ and $d$ are defined above.

Thus, the filter for each seismometer response in an even number array will have the function represented by the Fourier transform of:

$$A_n(f) = \frac{\sin 2\pi \frac{|f|}{v_0} d[\frac{1}{2} + (n-1)]}{\pi[\frac{1}{2} + (n-1)]} \quad (11)$$

wherein the terms are as defined above.

This Fourier transform can be obtained as has been set forth above with reference to an odd number of seismometers.

The individual filters of FIGURE 2 can be designed to provide the responses described above. This can readily be accomplished, for example, by converting the output signals from the seismometers to digital form and applying these signals to a digital computer which is programmed to provide the desired output responses. As an alternative, the filters can be constructed from conventional electrical circuit elements. One example of a filter network of this type is illustrated in FIGURE 4.

The output signal from seismometer 18g is applied to the input of a first conventional tapped delay line 25a. The output signals from seismometers 18f and 18h are combined and applied to the input of a second delay line 25b. Similarly, the outputs of the remaining seismometers are combined in pairs and applied to the inputs of the additional delay lines illustrated, the outputs of seismometers 18a and 18m being applied to the input of delay line 25g. These delay lines are provided with a plurality of spaced taps so that output signals can be removed with selected time delays, the delays between adjacent taps on each delay line generally being of the order of a few milliseconds. Delay line 25g is provided with 13 output taps. These taps are connected and applied through an input resistor 26g to the first input terminal of a summing amplifier 27. The single center tap of delay line 25a is applied to amplifier 27 through a resistor 26a. The three centermost taps of delay line 25b are applied through a resistor 26b to amplifier 27. Similarly, progressively larger numbers of pairs of central terminals of delay lines 25c, 25d . . . 25f are applied through respective resistors 26c, 26d . . . 26f to amplifier 27.

The delay lines thus far described provide conventional "box car" outputs, of progressively longer duration proceeding from delay line 25a to delay line 25g. The inputs, except to delay line 25a, can be paired in the manner illustrated because the associated input seismometers are spaced equal distances from seismometer 18g and thus require filters having the same general response, as described previously.

The summed output signal from amplifier 27 is applied to the input of an additional delay line 28. Delay line 28 is provided with a plurality of spaced taps which are applied to respective inputs of a second summing amplifier 30 through respective resistors 29a, 29b . . . 29p.

As previously mentioned, time delay lines 25a to 25g can be conventional tapped delay lines which provide delayed pulse outputs when an input pulse is applied. The individual delay lines thus provide "box car" output signals of progressively greater length, proceeding from delay line 25a to delay line 25g. Resistors 26a to 26g have progressively smaller values in the order named. These resistors are selected so that the product of the resistor value and the number of taps on the associated delay line is a constant for each delay line. For example, resistors 26a, 26b . . . 26g can have respective values (in megohms) of 15, 5, 3 . . . 0.6. Delay line 28 and the output circuit associated therewith are selected so as to provide a zero phase derivative filter. This can be accomplished, for example, by use of a tapped delay line of the type described in U.S. Patent 3,201,706, R. G. Piety, Aug. 17, 1965. Delay line 28 and the associated summing resistors are selected such that the filter has a response of the form illustrated in FIGURE 1 of the Piety patent when a single input pulse is applied to the input. As described in the Piety patent, the values of the resistors and the taps selected can be adjusted until the network provides the desired output response when single input pulses are applied. The Cardinal function response, which is of the form sin $X/X$ of the zero phase derivative filter, provides the corresponding portion of the expressions discussed above.

In the seismic exploration procedure of this invention, a series of vibrations are imparted to the earth sequentially at spaced points. A plurality of seismometer stations are associated with each of the spaced points, such as illustrated in FIGURE 1. The outputs of the individual seismometers at each station are filtered and combined in the manner described to provide a single composite signal at each of the seismometer stations. These individual signals can then be used in any conventional manner to provide information regarding the slopes of subterranean reflecting beds. In one specific method of application, these signals can be combined by the common point reflection procedure disclosed in U.S. Patent 3,040,833, Mendenhall et al., June 26, 1962. As an alternative, the signals can be combined in a seismic reflection search procedure such as described in U.S. Patent 3,213,412, Piety et al., Oct. 19, 1965. The outputs of the seismometers can be filtered by the procedure of this invention at the time the signals are obtained in the field. In this manner, recorder 22 receives only the composite signal. As an alternative, the output signals from each individual seismometer can be recorded such as by use of a magnetic tape, and subsequently filtered and combined at a central location. An important advantage of this procedure of this invention resides in the fact that the composite output signal from each seismometer station is statistically independent of the outputs from all other stations. The cut-off velocity employed in designing the filters may be of the order of 15,000 to 30,000 feet per second, or even higher, depending on the formation characteristics. In any even, this cut-off velocity should be such as to eliminate horizontally propagated signals while passing reflections.

While this invention has been described in conjunction with presently preferred embodiments, it should be evident that it is not limited thereto.

What is claimed is:

1. The method of seismic surveying which comprises imparting vibrations to the earth at a first point; detecting at a plurality of receiving stations the resulting vibrations which are reflected back to the surface of the earth from subterranean reflecting beds, said receiving stations being spaced from one another and from said first point and each having a plurality of vibration detectors located in spaced relationship with one another at different distances from said first point; establishing a plurality of output signals, each representative of vibrations received by a respective one of said detectors; and filtering and combining the output signals from the detectors at each of the receiving stations so that vibrations are rejected which have a horizontal apparent velocity across the receiving stations less than a predetermined value, thereby providing a plurality of summed signals, one for each station, said filtering and combining being accomplished by passing the signals through respective box car filters, the individual responses thereof being proportional in width to the distances that the respective detectors are spaced from one another, summing the output signals from the box car filters, and passing the resulting summed signal through a zero phase derivative filter.

2. The method of claim 1 wherein the detectors at each station are positioned on a straight line which extends in a direction from the station to the first point.

3. The method of claim 1 wherein the detectors at each station are located in groups which do not overlap adjacent groups.

4. Apparatus for use in seismic surveying comprising a plurality of groups of seismometers positioned in spaced relationship with one another adjacent the surface of the earth, such group being spaced from a first vibration imparting point and comprising a plurality of seismometers spaced from one another at different distances from said point, each seismometer being adapted to provide an output signal representative of vibrations received by the seismometer; a plurality of signal summing means, one for each group; and filter means connecting the seismometers in each group to the summing means associated with such group, each of said filter means comprising a plurality of box car filters, the individual responses thereof being proportional in width to the distances that the respective seismometers of the group are spaced from one another, means to sum the outputs of the box car filters connected to each group of seismometers, and a zero phase derivative filter connected to the output of said means to sum, the signal transmission characteristics of said filter and summing means being such that signals are rejected which represent vibrations having a horizontal apparent velocity across the group of seismometers which is less than a predetermined value and signals are transmitted which have such an apparent velocity greater than said predetermined value.

5. The apparatus of claim 4 wherein the seismometers in each group are located such that seismometers in adjacent groups do not overlap.

6. The apparatus of claim 4 wherein the seismometers in each group are positioned on a straight line which extends in a direction from said first point and the associated group of seismometers.

References Cited

UNITED STATES PATENTS 3,274,541   9/1966   Embree _____ 340—15.5

OTHER REFERENCES

"Pie Slice" Process: "The Pie Slice Process," Geophysical Service, Inc. Technical Bulletin 63–1, 1963, pp. 1–14.

RICHARD A. FARLEY, *Primary Examiner.*

C. E. WANDS, *Assistant Examiner.*